(12) United States Patent
Tan et al.

(10) Patent No.: US 12,633,089 B2
(45) Date of Patent: May 19, 2026

(54) THREE-DIMENSIONAL OBJECT DETECTION FRAMEWORK BASED ON MULTI-SOURCE DATA KNOWLEDGE TRANSFER

(71) Applicant: Sun Yat-sen University, Guangzhou (CN)

(72) Inventors: Xiaojun Tan, Guangzhou (CN);
Dapeng Feng, Guangzhou (CN);
Xiaodan Liang, Guangzhou (CN);
Huanyu Wang, Guangzhou (CN);
Chenrushi Yang, Guangzhou (CN);
Mengyu Yang, Guangzhou (CN)

(73) Assignee: Sun Yat-sen University, Guangzhou (CN)

( * ) Notice: Subject to any disclaimer, the term of this patent is extended or adjusted under 35 U.S.C. 154(b) by 826 days.

(21) Appl. No.: 17/917,268

(22) PCT Filed: Jan. 28, 2021

(86) PCT No.: PCT/CN2021/074212
§ 371 (c)(1),
(2) Date: May 8, 2023

(87) PCT Pub. No.: WO2021/203807
PCT Pub. Date: Oct. 14, 2021

(65) Prior Publication Data
US 2023/0260255 A1 Aug. 17, 2023

(30) Foreign Application Priority Data
Apr. 9, 2020 (CN) .......................... 202010272335.4

(51) Int. Cl.
G06V 10/00 (2022.01)
G06V 10/74 (2022.01)
(Continued)

(52) U.S. Cl.
CPC ........ G06V 10/7715 (2022.01); G06V 10/761 (2022.01); G06V 10/82 (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 10,438,371 B2 * 10/2019 Xu ........................ G06V 10/454
11,024,039 B2 * 6/2021 Danielsson .......... G06V 40/103
(Continued)

FOREIGN PATENT DOCUMENTS

CN 109523552 A 3/2019
CN 110045729 A 7/2019
(Continued)

*Primary Examiner* — Amir Alavi
(74) *Attorney, Agent, or Firm* — Jose Cherson Weissbrot

(57) ABSTRACT

Provided is a three-dimensional object detection framework based on multi-source data knowledge transfer. By outputting an image feature extracted by an image feature extraction unit, an interested target selection unit outputs point cloud data of an interested target to a point cloud feature extraction unit according to the image feature; the point cloud feature extraction unit extracts a point cloud feature from the point cloud data; in a knowledge transfer unit, enable the image feature to learn the point cloud feature and update parameters of the image feature extraction unit, while a three-dimensional target parameter prediction unit updates parameters of the image feature and point cloud feature extraction units according to the image feature and the point cloud feature. Finally, the updated image feature extraction unit re-extracts the image feature to the three-dimensional target parameter prediction unit, which reckons and inputs three-dimensional parameters according to the image feature.

7 Claims, 5 Drawing Sheets

(51) Int. Cl.
  *G06V 10/77*      (2022.01)
  *G06V 10/82*      (2022.01)

(58) Field of Classification Search
  CPC .... G06N 3/092; G06N 3/0454; G06N 3/0475;
        G06N 3/0464; G06V 10/82; G06V
        10/7715; G06V 10/25; G06V 10/761;
        G06V 10/44; G06V 10/764; G06V 20/64;
                  G06V 20/647
  See application file for complete search history.

(56)              References Cited

U.S. PATENT DOCUMENTS

| | | | | |
|---|---|---|---|---|
| 11,042,762 | B2 * | 6/2021 | Li | G01S 7/4972 |
| 11,379,699 | B2 * | 7/2022 | Xie | G06F 18/214 |
| 11,462,029 | B2 * | 10/2022 | Ye | G06V 10/44 |
| 11,593,587 | B2 * | 2/2023 | Lee | G06V 10/764 |
| 11,618,438 | B2 * | 4/2023 | Srivatsa | G06F 18/2148 |
| | | | | 701/28 |
| 11,875,524 | B2 * | 1/2024 | Luo | G01B 11/24 |
| 11,964,654 | B2 * | 4/2024 | Bialer | B60W 30/0956 |
| 11,967,037 | B2 * | 4/2024 | Catana Salazar | G06F 30/27 |
| 2021/0383231 | A1 * | 12/2021 | Liu | G06F 18/24323 |
| 2023/0260255 | A1 * | 8/2023 | Tan | G06N 3/0464 |
| | | | | 382/100 |

FOREIGN PATENT DOCUMENTS

| | | | |
|---|---|---|---|
| CN | 111507222 | A | 8/2020 |
| EP | 3525131 | A1 | 8/2019 |

* cited by examiner

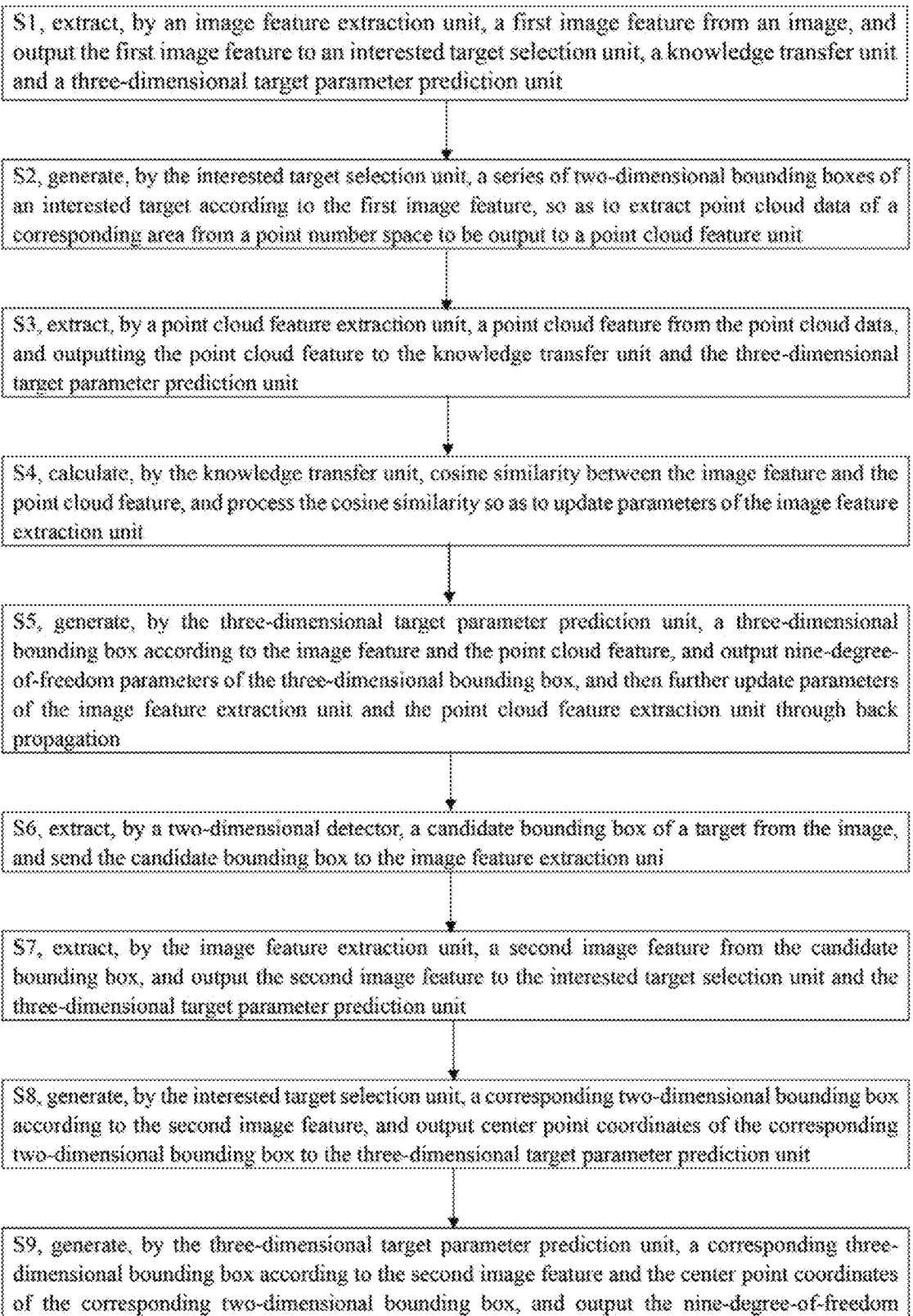

S1, extract, by an image feature extraction unit, a first image feature from an image, and output the first image feature to an interested target selection unit, a knowledge transfer unit and a three-dimensional target parameter prediction unit S2, generate, by the interested target selection unit, a series of two-dimensional bounding boxes of an interested target according to the first image feature, so as to extract point cloud data of a corresponding area from a point number space to be output to a point cloud feature unit S3, extract, by a point cloud feature extraction unit, a point cloud feature from the point cloud data, and outputting the point cloud feature to the knowledge transfer unit and the three-dimensional target parameter prediction unit S4, calculate, by the knowledge transfer unit, cosine similarity between the image feature and the point cloud feature, and process the cosine similarity so as to update parameters of the image feature extraction unit S5, generate, by the three-dimensional target parameter prediction unit, a three-dimensional bounding box according to the image feature and the point cloud feature, and output nine-degree-of-freedom parameters of the three-dimensional bounding box, and then further update parameters of the image feature extraction unit and the point cloud feature extraction unit through back propagation S6, extract, by a two-dimensional detector, a candidate bounding box of a target from the image, and send the candidate bounding box to the image feature extraction uni S7, extract, by the image feature extraction unit, a second image feature from the candidate bounding box, and output the second image feature to the interested target selection unit and the three-dimensional target parameter prediction unit S8, generate, by the interested target selection unit, a corresponding two-dimensional bounding box according to the second image feature, and output center point coordinates of the corresponding two-dimensional bounding box to the three-dimensional target parameter prediction unit S9, generate, by the three-dimensional target parameter prediction unit, a corresponding three-dimensional bounding box according to the second image feature and the center point coordinates of the corresponding two-dimensional bounding box, and output the nine-degree-of-freedom parameters of the corresponding three-dimensional bounding box

FIG. 1

THREE-DIMENSIONAL OBJECT DETECTION FRAMEWORK BASED ON MULTI-SOURCE DATA KNOWLEDGE TRANSFER

TECHNICAL FIELD

The present disclosure relates to the fields of machine learning and computer vision, and in particular to a three-dimensional object detection framework based on multi-source data knowledge transfer.

BACKGROUND

Three-dimensional object detection is an important research field of computer vision, and has a wide range of application scenarios in industrial production and daily life, such as a driverless car, and an intelligent robot.

Compared with two-dimensional object detection, three-dimensional object detection tasks are more challenging and richer in practical application value. Three-dimensional object detection mainly completes tasks of object recognition and positioning, and obtains three-dimensional information of an object, including center point coordinates $C_x$, $C_y$, $C_z$ of the object, an object size, namely, a length l, a width w and a height h of the object, and a direction angle $\alpha$, $\beta$, $\gamma$. In recent years, development of deep learning has greatly improved the speed and precision of two-dimensional object detection. However, due to lack of depth information in two-dimensional RGB images, detection precision of an existing image-based three-dimensional object detection method lags far behind that of a point cloud data-based three-dimensional object detection method. Therefore, how to use point cloud data to improve the precision of image-based three-dimensional object detection has become an industry research direction.

SUMMARY

In view of the above shortcomings of the prior art, a three-dimensional object detection framework based on multi-source data knowledge transfer is provided. In a training phase, a neural network is used to extract an image feature and a point cloud feature, and then in a feature space, the image feature is made to learn the point cloud feature. Finally, in an inference stage, only the image feature is used to predict three-dimensional parameters of an object.

The present disclosure implements the above objective in this way:

The present disclosure provides a three-dimensional object detection framework based on multi-source data knowledge transfer, including the following steps:

S1, extracting, by an image feature extraction unit, a first image feature from an image, and outputting the first image feature to an interested target selection unit, a knowledge transfer unit and a three-dimensional target parameter prediction unit;

S2, generating, by the interested target selection unit, a series of two-dimensional bounding boxes of an interested target according to the first image feature, so as to extract point cloud data of a corresponding area from a point number space and output to a point cloud feature unit;

S3, extracting, by a point cloud feature extraction unit, a point cloud feature from the point cloud data, and outputting the point cloud feature to the knowledge transfer unit and the three-dimensional target parameter prediction unit;

S4, calculating, by the knowledge transfer unit, cosine similarity between the image feature and the point cloud feature, and processing the cosine similarity, so as to update parameters of the image feature extraction unit;

S5, generating, by the three-dimensional target parameter prediction unit, a three-dimensional bounding box according to the image feature and the point cloud feature, and outputting nine degree-of-freedom parameters of the three-dimensional bounding box, and then further updating parameters of the image feature extraction unit and the point cloud feature extraction unit through back propagation;

S6, extracting, by a two-dimensional detector, a candidate bounding box of a target from the image, and sending the candidate bounding box to the image feature extraction unit;

S7, extracting, by the image feature extraction unit, a second image feature from the candidate bounding box, and outputting the second image feature to the interested target selection unit and the three-dimensional target parameter prediction unit;

S8, generating, by the interested target selection unit, a corresponding two-dimensional bounding box according to the second image feature, and outputting center point coordinates of the corresponding two-dimensional bounding box to the three-dimensional target parameter prediction unit; and S9, generating, by the three-dimensional target parameter prediction unit, a corresponding three-dimensional bounding box according to the second image feature, and calculating and outputting nine degree-of-freedom parameters of the corresponding three-dimensional bounding box according to the corresponding three-dimensional bounding box and the center point coordinates of the corresponding two-dimensional bounding box.

Further, before the step S1, the three-dimensional object detection framework further includes: extracting the candidate bounding box of the target from the image by using the two-dimensional detector, so as to obtain the point cloud data of the corresponding area in a point cloud space according to the candidate bounding box of the target.

Further, before the step S1, the three-dimensional object detection framework further includes: receiving, by a computer system, an annotation label input by a tester for the image.

Further, the step S2 includes:

S2-1, detecting, by the interested target selection unit, the interested target from the first image feature, and using an RPN network to output the series of two-dimensional bounding boxes corresponding to the interested target; and S2-2, calculating IoU values of the two-dimensional bounding boxes corresponding to the interested target and the annotation label on the two-dimensional image, and selecting an annotation label with the maximum IoU value as a real label of the interested target, extracting and outputting point cloud data of an area that has a corresponding relationship with the real label to the point cloud feature extraction unit in the point number space, and further outputting the center point coordinates of the two-dimensional bounding boxes to the three-dimensional target parameter prediction unit.

Further, the step S3 specifically includes:

S3-1, inputting the point cloud data into a one-dimensional convolutional neural network model;

S3-2, improving training performance of the one-dimensional convolutional neural network model through residual connection, and enhancing a modeling ability of the one-dimensional convolutional neural network model to global information of the point cloud space through an attention mechanism; and S3-3, executing a maximum pooling operation to obtain a point cloud feature corresponding to the interested target.

Further, the step S4 includes:

S4-1, calculating the cosine similarity between the received image feature and the point cloud feature according to the received image feature and the point cloud feature;

S4-2, minimizing the cosine similarity; and

S4-3, calculating and backpropagating a gradient of the image feature to update parameters of a two-dimensional convolutional neural network model of the image feature unit.

Further, the step S5 includes:

S5-1, mapping, by a linear layer of the three-dimensional target parameter prediction unit, the received image feature and the point cloud feature to generate a three-dimensional bounding box;

S5-2, predicting a depth coordinate z, and then predicting coordinates x and y of the three-dimensional bounding box by the following formula (1), wherein the formula (1) is:

$$x = \frac{(u - c_u) * z}{f_u} \tag{1}$$

$$y = \frac{(v - c_v) * z}{f_v}$$

where, $[f_u, 0, c_u; 0, f_v, c_v; 0,0,1]$ is internal parameters of a camera, and (u, v) is pixel coordinates of a center point of the two-dimensional bounding box obtained by the interested target selection unit;

S5-3, predicting quaternion by the following formula (2) according to the center point coordinates of the three-dimensional bounding box, and then converting the quaternion into an Euler angle by the following formula (3) to eliminate a Gimbal lock problem of the Euler angle, wherein expressions of the formulas (2) and (3) are as follows:

$$\operatorname{atan2}(x, y) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases} \tag{2}$$

$$\begin{bmatrix} \alpha \\ \beta \\ \gamma \end{bmatrix} = \begin{bmatrix} \operatorname{atan2}(2(wx + yz), 1 - 2(x^2 + y^2)) \\ \arcsin(2(wy - xz)) \\ \operatorname{atan2}(2(wz + xy), 1 - 2(y^2 + z^2)) \end{bmatrix} \tag{3}$$

where, the quaternion is expressed as $\vec{q} = (w, x, y, z) = w + xi + yj + zk$, and the Euler angle is expressed as roll, pitch, yaw = $(\alpha, \beta, \gamma)$;

S5-4, calculating length, width and height parameters of the three-dimensional bounding box according to the center point coordinates of the three-dimensional bounding box, the Euler angle, and mapping of the image feature and the point cloud feature on the linear layer, and outputting the center point coordinates (x, y, z) of the three-dimensional bounding box, the Euler angle parameters $(\alpha, \beta, \gamma)$, and the length, width, and height parameters of the three-dimensional bounding box; and S5-5, calculating gradients of the image feature and the point cloud feature, and performing backpropagation through the gradient, so as to update corresponding parameters of the image feature extraction unit and the point cloud feature extraction unit.

The present disclosure has the beneficial effects that: the present disclosure provides the three-dimensional object detection framework based on multi-source data knowledge transfer. For implementing the technical solution provided by the present disclosure, the image feature extraction unit outputs the extracted image feature to the interested target selection unit, the knowledge transfer unit and the three-dimensional target parameter prediction unit, the interested target selection unit outputs the two-dimensional bounding box of the interested target according to the image feature, extracts the corresponding point cloud data from the point cloud space according to the two-dimensional bounding box, and outputs the point cloud data to the point cloud feature extraction unit, and then the point cloud feature extraction unit extracts the corresponding point cloud feature to the knowledge transfer unit. Then, the knowledge unit calculates the cosine similarity between the image feature and the point cloud feature, and updates parameters of the image feature extraction unit according to the cosine similarity, so that the image feature is gradually similar to the point cloud feature, and thus the image feature learns the point cloud feature. Then, the three-dimensional target parameter prediction unit outputs the nine degree-of-freedom parameters of the three-dimensional bounding box according to the image feature and the point cloud feature, and simultaneously updates the parameters of the image feature extraction unit and the point cloud feature extraction unit during backpropagation. Finally, the two-dimensional detector detects and extracts the candidate bounding box of the object from the image, and extracts the image feature from the candidate bounding box by using the updated image feature extraction unit, and the interested object selection unit and the three-dimensional target parameter prediction unit processes the image feature to predict the three-dimensional parameters of the target. Compared with the prior art, since the image feature learning the point cloud feature has the ability to express three-dimensional space information, the accuracy of image-based three-dimensional object parameter prediction can be effectively improved.

BRIEF DESCRIPTION OF FIGURES

The present disclosure is further described below in conjunction with accompanying drawings and embodiments.

FIG. 1 is a schematic diagram of a general flow of a three-dimensional object detection framework based on multi-source data knowledge transfer according to an embodiment of the present disclosure.

DETAILED DESCRIPTION

In order to make the objective, technical solutions and advantages of the present disclosure clearer, the present disclosure will be further illustrated in detail below with reference to embodiments and accompanying drawings. The exemplary implementation solutions of the present disclosure and their illustration are only used to parse the present disclosure, and are not intended to limit the present disclosure.

It can be understood that the above embodiments only represent the preferred implementations of the present disclosure, and their descriptions are more specific and detailed, but should not be construed as a small limitation to the patent scope of the present disclosure. It should be pointed out that for those of ordinary skill in the art, under a premise of not departing from the concept of the present disclosure, the above technical characteristics can be freely combined, and some deformations and improvements can also be made, which all belong to the protection scope of the present disclosure. Therefore, all equivalent transformations and modifications made with the claims and scope of the present disclosure shall fall within the covering scope of the claims of the present disclosure.

Figure 2:
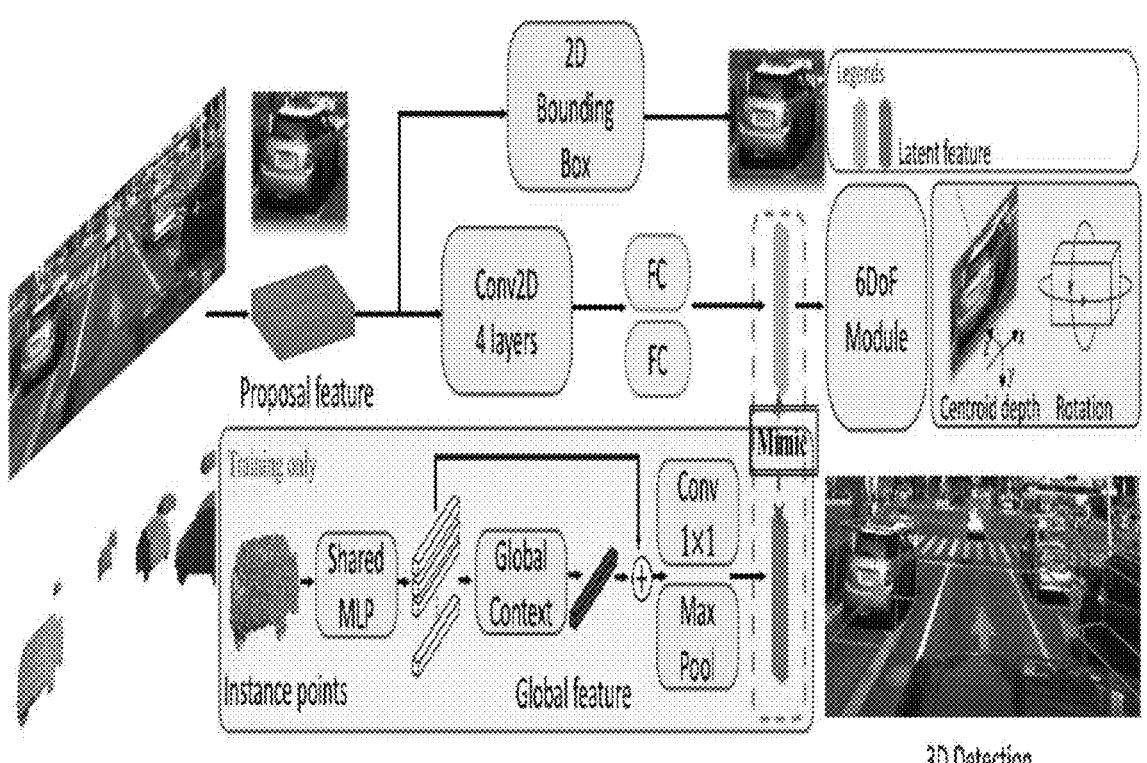
FIG. 2 is a schematic diagram of a training flow at a neural network training stage in an embodiment of the present disclosure. In the figure, proposal feature is an image detector, conv2D and fc constitute an image feature extraction unit, shared MLP, global context, cony 1×1 and max pool constitute a point cloud feature extraction unit, mimic is a knowledge transfer unit, 2D Bounding Box is an interested target selection unit, and 6DoF Module is a three-dimensional target parameter prediction unit.

The present disclosure provides a three-dimensional object detection framework based on multi-source data knowledge transfer. The three-dimensional object detection framework is applied to a computer system provided with an image feature extraction unit, an interested target selection unit, a point cloud feature extraction unit, a knowledge transfer unit, and a three-dimensional target parameter prediction unit. The three-dimensional object detection framework needs to go through a neural network training stage and a neural network inference stage to implement three-dimensional prediction of an object in an image. The specific operation flow is shown in FIG. 1, wherein an operation flow in the neural network training phase is shown in FIG. 2.

The implementation of the three-dimensional object detection framework to predict three-dimensional parameters of the object in the image specifically includes the following steps:

S1, an image feature extraction unit extracts a first image feature from the image, and outputs the first image feature to an interested target selection unit, a knowledge transfer unit and a three-dimensional target parameter prediction unit. Specifically, a computer system inputs the image collected by each camera into the image feature extraction unit, and the image feature extraction unit uses a two-dimensional convolutional neural network model in its unit to extract an image feature from the obtained image, takes the extracted image feature as the first image feature, and then sends the first image feature to the interested target selection unit, the knowledge transfer unit and the three-dimensional target parameter prediction unit.

Figure 3:
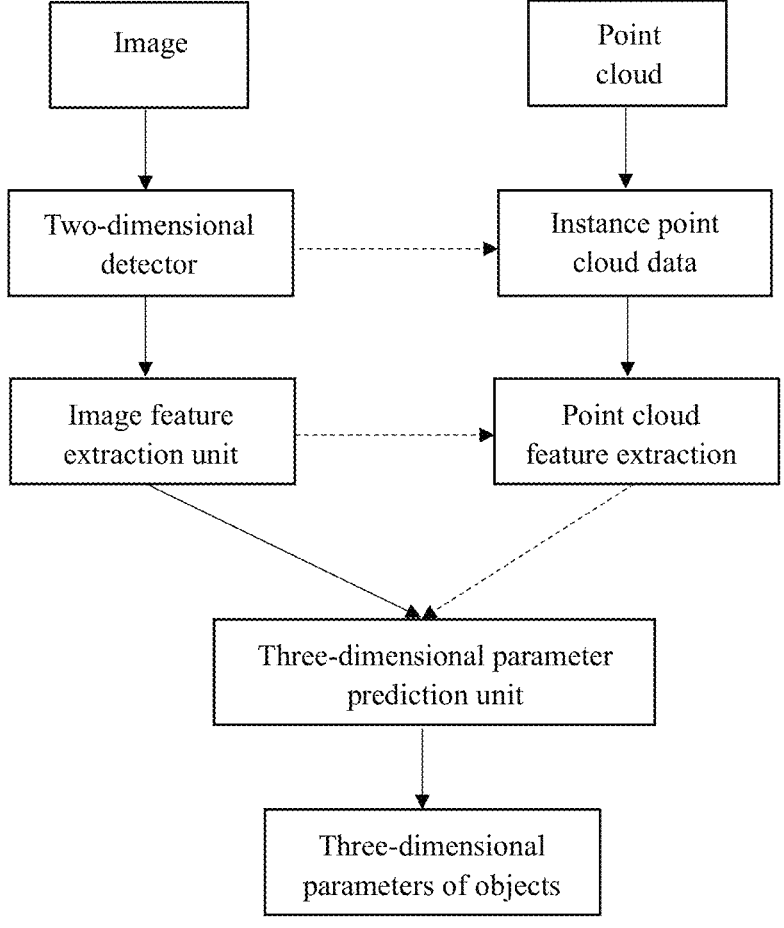
FIG. 3 is a schematic flow diagram of obtaining point cloud data of a corresponding area in a point cloud space according to an embodiment of the present disclosure.

Further, before executing the step S1, the computer system further executes the following operations: after receiving the image collected by each camera, a three-dimensional point cloud processing unit in the system is used to process the image, so as to obtain instance point cloud data corresponding to the image, and store the instance point cloud data in a point cloud space; then, as shown in FIG. 3, a two-dimensional detector in the computer system detects the image so as to detect a target from the image, and generates a candidate bounding box of the target and a plurality of two-dimensional annotation boxes, by matching the candidate bounding box with the plurality of corresponding two-dimensional annotation boxes, an IoU value between the candidate bounding box and each of two-dimensional annotation boxes corresponding to the candidate bounding box is calculated, and a two-dimensional annotation box with the maximum IoU value is selected as a real value of the candidate bounding box; next, the two-dimensional annotation box with the maximum IoU value is mapped to the point cloud space where the implemented point cloud data are stored to obtain a three-dimensional annotation box, and the point cloud data framed by the three-dimensional annotation box in the point cloud space are the point cloud data corresponding to the candidate bounding frame; and after that, the point cloud data framed are extracted and output to the point cloud feature extraction unit, and later, the image feature and point cloud extracted by the image feature extraction unit and the point cloud feature extraction unit are respectively input into the three-dimensional parameter prediction unit, and the three-dimensional parameter prediction unit predicts the three-dimensional parameters of the target object according to these features.

Further, before sending the collected image to the image feature extraction unit, the computer system further receives at least one annotation label manually input by a tester for the image, and then the computer system inputs the annotation label corresponding to the image to the image feature extraction unit.

S2, the interested target selection unit generates a series of two-dimensional bounding boxes of an interested target according to the first image feature. Specifically, the flow of extracting and outputting the point cloud data by the interested target selection unit is as follows:

S2-1, the interested target selection unit detects the interested target from the first image feature, and uses an RPN network to output the series of two-dimensional bounding boxes corresponding to the interested target; and S2-2, IoU values of the two-dimensional bounding boxes corresponding to the interested target and the annotation label on the two-dimensional image are calculated so as to select an annotation label with a maximum IoU value as a real label of the interested target, then point cloud data of an area that has a corresponding relationship with the real label are extracted and output to the point cloud feature extraction unit in a point number space, and center point coordinates of the two-dimensional bounding box are further calculated, and output to the three-dimensional target parameter prediction unit, wherein the annotation label refers to a label manually labeled by the tester on the image before step 1 is executed.

S3, A point cloud feature extraction unit extracts a point cloud feature from the point cloud data, and outputs the point cloud feature to the knowledge transfer unit and the three-dimensional target parameter prediction unit. Specifically, the point cloud feature extraction unit extracts the point cloud feature through the following flow:

S3-1, the point cloud data are input into a one-dimensional convolutional neural network model;

S3-2, training performance of the one-dimensional convolutional neural network model is improved through residual connection, and a modeling ability of the one-dimensional convolutional neural network model to global information of the point cloud space is enhanced through an attention mechanism; and S3-3, a maximum pooling operation is executed to obtain the point cloud feature corresponding to the interested target. The maximum pooling operation is executed on results output by a convolutional layer of the neural network trained by residual connection and the attention mechanism, so as to obtain and learn a point with a maximum value in a local receptive field, and extract this point as the point cloud feature.

Understandably, in a network with a large number of network layers, as a network depth increases, the training difficulty of the network increases, and problems such as neural network degradation, gradient dissipation, and gradient explosion are prone to occur, resulting in a large error between the output results and a sample and decrease of accuracy of the model. In the one-dimensional convolutional neural network model, by adding a connection shortcut, that is, a residual block, between every two convolutional layers, a residual module inputs a residual term f(x) to the next convolutional layer so as activate the convolutional layer, and an output result x of the previous convolutional layer is directly transmitted to output of the next convolutional layer, so as to serve as an initial output result of the next convolutional layer, so that the output result F(x) of the next convolutional layer is F(x)=x+f(x). After that, when a chain rule is directly used to derive the gradient of F(x), the gradient can be avoided to be close to 0, so as to ensure that the gradient does not disappear or the gradient explodes when the network updates the parameters. Moreover, when f(x)=0, F(x)=x realizes identity mapping, and a network degradation problem is caused by learning, by redundant layers in the network, parameter not for realizing the identity mapping. By making the redundant layers learn f(x)=0, the redundant layers realize the identity mapping, thereby speeding up network convergence and avoiding network degradation.

Figure 4:
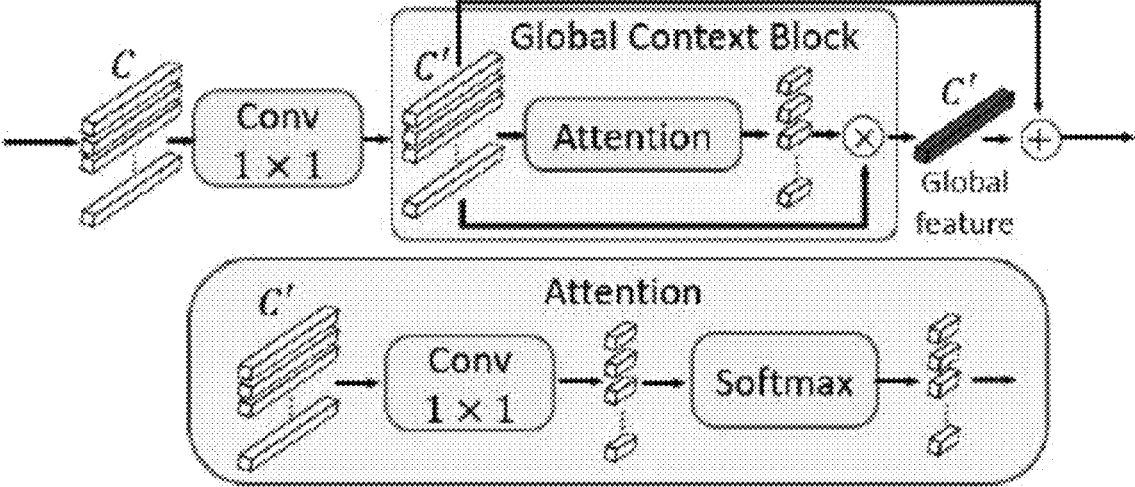
FIG. 4 is a schematic flow diagram of enhancing, by a point cloud feature extraction unit, a modeling ability of a one-dimensional convolutional neural network model to global information of a point cloud space in an embodiment of the present disclosure.

As for enhancing the modeling ability of the one-dimensional convolutional neural network model to the global information of the point cloud space through the attention mechanism, the specific principle is shown in FIG. 4. First, a convolution operation is performed on each input vector so as to reduce dimension of the input vector, then a weight corresponding to each input vector is obtained through softmax, then a corresponding global feature is obtained by weighted summation of the input vector, and finally the global feature is added to each input vector to increase the global response of the input vector, thereby enhancing the modeling ability of the one-dimensional convolutional neural network model to the global information of the point cloud space.

S4, the knowledge transfer unit calculates cosine similarity between the image feature and the point cloud feature according to the image feature and the point cloud feature, and calculates a gradient of the backpropagated image feature after minimizing the cosine similarity so as to update parameters of the image feature extraction unit. The parameters of the image feature extraction unit are updated, so that the image feature extracted by the updated image feature extraction unit has an ability to express a three-dimensional space.

The specific process for the knowledge transfer unit to implement the above objective is as follows:

S4-1, the cosine similarity between the received image feature and the point cloud feature is calculated according to the received image feature and the point cloud feature; after receiving the image feature and the point cloud feature, the knowledge transfer unit encodes the image feature and the point cloud feature into a first feature vector and a second feature vector respectively by using a feature encoding method, so as to map the first feature vector and the second feature vector to a high-dimensional space, and obtain its corresponding array in the high-dimensional space, and then, the cosine similarity between the image feature and the point cloud feature is calculated according to the calculation method of the cosine similarity. By calculating the cosine similarity between the image feature and the point cloud feature, it can be determined whether the two vectors are similar. If a calculation result is closer to 1, it means that the two features are more similar, that is, the image feature is closer to the point cloud feature. Since the point cloud feature has the ability to express the three-dimensional space, if the image feature is very similar to the corresponding point cloud feature, it means that the image feature can express more three-dimensional space information.

S4-2, the cosine similarity is minimized. The purpose of minimizing the cosine similarity is to overcome a defect that the cosine similarity is insensitive to the array of the feature vectors, so as to make obvious difference between the characteristic of the individuals, the cosine similarity is minimized. The purpose of minimizing the cosine similarity is to overcome a defect that the cosine similarity is insensitive to the array of the feature vectors, so as to make obvious characteristic difference between the individuals to make the knowledge transfer unit transfer the point cloud feature to an image feature extractor.

S4-3, the gradient of the image feature is calculated and backpropagated so as to update parameters of a two-dimensional convolutional neural network model of the image feature unit. Specifically, the error between the image feature and the point cloud feature can be obtained according to the minimized cosine similarity, the gradient of the image feature is calculated and backpropagated according to the error, and then all the parameters of the two-dimensional convolutional neural network of the image feature unit, such as weight and a bias value, are updated and adjusted so as to find a minimum value of a loss function in the two-dimensional convolutional neural network.

By repeating the above steps S4-1 to S4-3, the value of the loss function of the two-dimensional convolutional neural network gradually approaches or even reaches the minimum value, and in this way, the image feature extracted by the image feature extraction unit and the point cloud feature are more and more similar, so that the image feature learns the point cloud feature. Since the point cloud feature has the ability to express the three-dimensional space information, when the image feature is closer to the point cloud feature, the image feature expresses more three-dimensional spatial information, which is more conducive to improving the accuracy of three-dimensional object parameter prediction.

S5, the three-dimensional target parameter prediction unit generates a three-dimensional bounding box according to the image feature and the point cloud feature, and outputs nine degree-of-freedom parameters of the three-dimensional bounding box, and then further updates parameters of the image feature extraction unit and the point cloud feature extraction unit through back propagation. The nine degree-of-freedom parameters of the three-dimensional bounding box refer to the center point coordinates (x, y, z) of the three-dimensional bounding box, Euler angle parameters (α, β, γ), and length, width, and height parameters of the three-dimensional bounding box.

Figure 5:
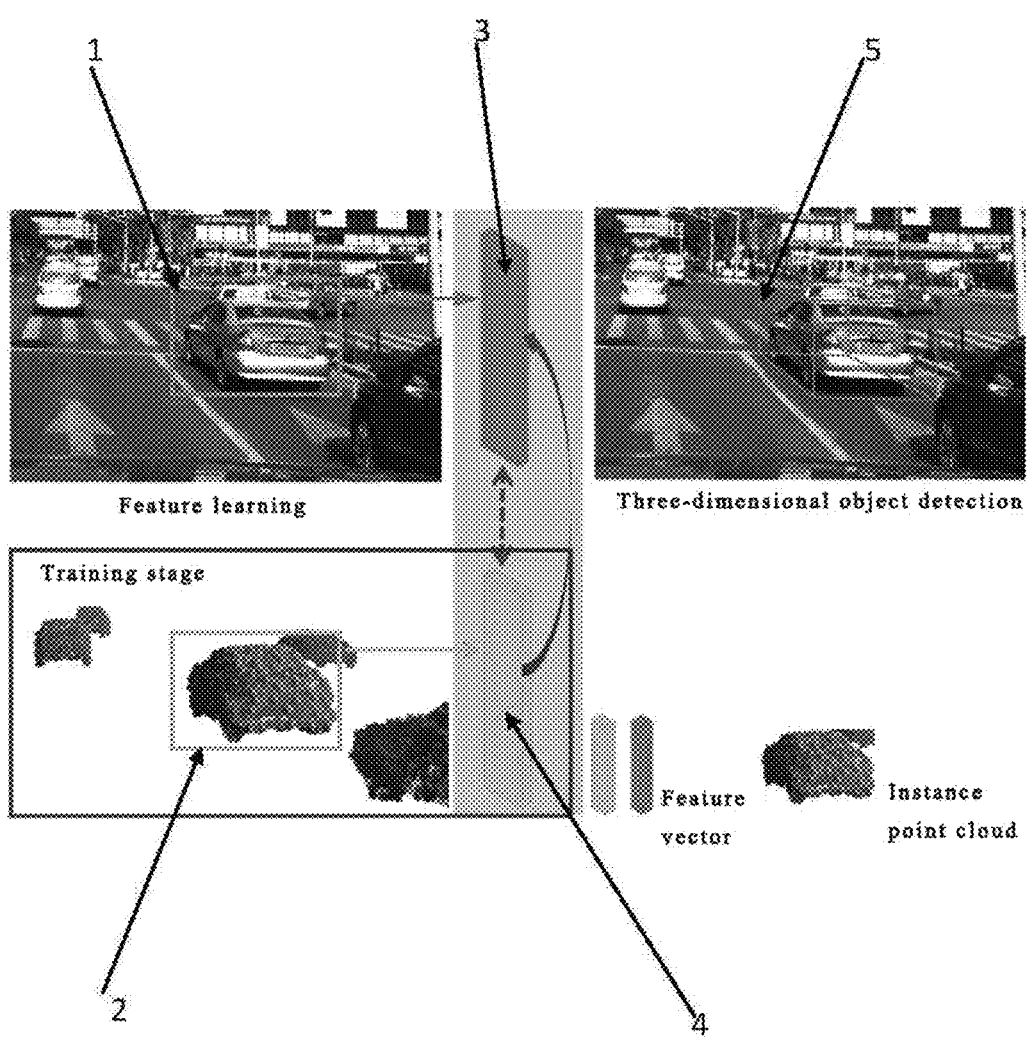
FIG. 5 is a schematic diagram of a generation flow of a three-dimensional bounding box at a neural network training stage in an embodiment of the present disclosure. In the figure, 1 is an image feature, 2 is a point cloud feature, 3 is a first feature vector, and 4 is a second feature vector, and 5 is a three-dimensional bounding box.

Specifically, the workflow of the three-dimensional target parameter prediction unit is as follows:

S5-1, the linear layer of the three-dimensional target parameter prediction unit maps the image feature and the point cloud feature to output the corresponding three-dimensional bounding box. After the image feature learns the point cloud feature, as shown in FIG. 5, the knowledge transfer unit inputs the first feature vector corresponding to the image feature and the second feature vector corresponding to the point cloud feature to a fully connected layer, namely the linear layer of the three-dimensional target parameter prediction unit, and the linear layer maps the first feature vector and the second feature vector to output a three-dimensional bounding box corresponding to a detection target.

S5-2, the center point coordinates of the three-dimensional bounding box are calculated and predicted, specifically, a depth coordinate z is predicted first, and then the coordinates x and y (x, y) are predicted by the following formula (1). A prediction mode of the depth coordinate z is—according to a definition of a training data set up in advance in the framework, a shortest prediction distance and a longest prediction distance are set, a difference value between the shortest prediction distance and the longest prediction distance is taken as a depth distance, the depth distance is divided into N distance intervals in equal parts, then a possible probability of the target object appearing in the different distance intervals is predicted, and finally an expected z is solved according to the possible probability. The formula (1) is:

$$x = \frac{(u - c_u) * z}{f_u} \tag{1}$$

$$y = \frac{(v - c_v) * z}{f_v}$$

where, $[f_u, 0, c_u; 0, f_v, c_v; 0,0,1]]$ is internal parameters of a camera, and (u, v) is pixel coordinates of a center point of the two-dimensional bounding box obtained by the interested target selection unit, thereby obtaining the center point coordinates (x, y, z) of the three-dimensional bounding box.

S5-3, quaternion is predicted by the following formula (2) according to the center point coordinates of the three-dimensional bounding box, and then the quaternion is converted into an Euler angle by a formula (3) so as to eliminate a Gimbal lock problem of the Euler angle, wherein expressions of the formulas (2) and (3) are as follows:

$$\mathrm{atan2}(x, y) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases} \tag{2}$$

$$\begin{bmatrix} \alpha \\ \beta \\ \gamma \end{bmatrix} = \begin{bmatrix} \mathrm{atan2}(2(wx + yz), 1 - 2(x^2 + y^2)) \\ \arcsin(2(wy - xz)) \\ \mathrm{atan2}(2(wz + xy), 1 - 2(y^2 + z^2)) \end{bmatrix} \tag{3}$$

where, the quaternion is expressed as $\vec{q} = (w, x, y, z) = w + xi + yj + zk$, and the Euler angle is expressed as roll, pitch, yaw $= (\alpha, \beta, \gamma)$.

S5-4, the length, width and height parameters of the three-dimensional bounding box are calculated according to the center point coordinates of the three-dimensional bounding box, the Euler angle, and mapping of the image feature and the point cloud feature on the linear layer, and the center point coordinates (x, y, z) of the three-dimensional bounding box, the Euler angle parameters (α, β, γ), and the length, width, and height parameters of the three-dimensional bounding box are output.

S5-5, gradients of the image feature and the point cloud feature are calculated, and backpropagation is performed through the gradients, so as to update corresponding parameters of the two-dimensional convolutional neural network of the image feature extraction unit and the one-dimensional convolutional neural network of the point cloud feature extraction unit, and meanwhile further update corresponding parameters of the fully connected layer, namely the linear layer of the three-dimensional target parameter prediction unit.

Further, both the knowledge transfer unit and the three-dimensional target parameter prediction unit can simultaneously update the relevant parameters of the image feature extraction unit.

The above steps S1-S5 are all executed in the neural network training stage, and the objective of executing the above steps is to make the image feature learn the expression of the point cloud feature, so that the image feature has the ability to express the three-dimensional space. When the neural network training stage ends, the framework enters into the neural network inference stage, and executes the following steps to output the predicted object parameters of the three-dimensional target based on the two-dimensional image:

S6, a two-dimensional detector extracts a candidate bounding box of a target from the image, and sends the candidate bounding box to the image feature extraction unit;

S7, the image feature extraction unit extracts a second image feature from the candidate bounding box, and outputs the second image feature to the interested target selection unit and the three-dimensional target parameter prediction unit;

S8, the interested target selection unit generates a corresponding two-dimensional bounding box according to the second image feature, and outputs center point coordinates of the corresponding two-dimensional bounding box to the three-dimensional target parameter prediction unit; and S9, the three-dimensional target parameter prediction unit generates a corresponding three-dimensional bounding box according to the second image feature, and calculates and outputs the nine degree-of-freedom parameters of the corresponding three-dimensional bounding box according to the corresponding three-dimensional bounding box and the center point coordinates of the corresponding two-dimensional bounding box. The linear layer of the three-dimensional target parameter prediction unit maps the second image feature to generate the corresponding three-dimensional bounding box, and then, by performing the operations described in the above steps S5-2 to S5-4, the nine degree-of-freedom parameters of the corresponding three-dimensional bounding box, that is, the center point coordinates (x, y, z), the Euler angle parameters ($\alpha$, $\beta$, $\gamma$), and the length, width, and height of the corresponding three-dimensional bounding box are calculated, and the resulting nine degree-of-freedom parameters are output as the final result of detecting the three-dimensional parameters of the target object.

What is claimed is:

1. A three-dimensional object detection framework based on multi-source data knowledge transfer, the three-dimensional object detection framework comprising:

an image feature extraction unit, configured to extract a first image feature from an image, and outputting the first image feature to an interested target selection unit, a knowledge transfer unit and a three-dimensional target parameter prediction unit, wherein the image feature extraction unit uses a two-dimensional convolutional neural network model to extract the first image feature from the image, takes the extracted image feature as the first image feature;

the interested target selection unit, configured to generate a series of two-dimensional bounding boxes of an interested target according to the first image feature, so as to extract a point cloud data of a corresponding area from a point number space and output to a point cloud feature unit;

a point cloud feature extraction unit, configured to extract a point cloud feature from the point cloud data, the first image feature, and the point cloud data, and outputting the point cloud feature to the knowledge transfer unit and the three-dimensional target parameter prediction unit to predict three-dimensional parameters of a target object;

the knowledge transfer unit, configured to calculate a cosine similarity between the image feature and the point cloud feature, and processing the cosine similarity, so as to update parameters of the image feature extraction unit, so that the image feature extracted by the updated image feature extraction unit has an ability to express a three-dimensional space;

the three-dimensional target parameter prediction unit, configured to generate a three-dimensional bounding box according to the image feature and the point cloud feature, and outputting nine degree-of-freedom parameters of the three-dimensional bounding box, and then further updating the parameters of the image feature extraction unit and the point cloud feature extraction unit through back propagation, wherein the nine degree-of-freedom parameters of the three-dimensional bounding box refer to a center point coordinates (x, y, z) of the three-dimensional bounding box, an Euler angle parameters ($\alpha$,$\beta$, $\gamma$), and length, width, and height parameters of the three-dimensional bounding box;

a two-dimensional detector, configured to detect a candidate bounding box of a target from the image of the target and a plurality of two-dimensional annotation boxes, by matching the candidate bounding box with the plurality of corresponding two-dimensional annotation boxes, and sending the candidate bounding box to the image feature extraction unit;

the image feature extraction unit, configured to extract a second image feature from the candidate bounding box, and outputting the second image feature to the interested target selection unit and the three-dimensional target parameter prediction unit;

the interested target selection unit, configured to generate a corresponding two-dimensional bounding box according to the second image feature, extracts the corresponding point cloud data from a point cloud space according to the two-dimensional bounding box, and outputs the point cloud data to the point cloud feature extraction unit, and then the point cloud feature extraction unit extracts the corresponding point cloud feature to the knowledge transfer unit; and the three-dimensional target parameter prediction unit, configured to generate a corresponding three-dimensional bounding box according to the second image feature and the center point coordinates of the corresponding two-dimensional bounding box, and outputting the nine degree-of-freedom parameters of the corresponding three-dimensional bounding box and the center point coordinates of the corresponding two-dimensional bounding box, wherein a linear layer of the three-dimensional target parameter prediction unit maps the second image feature to generate the corresponding three-dimensional bounding box.

2. The three-dimensional object detection framework based on multi-source data knowledge transfer according to claim 1, wherein before the extraction of the first image feature from the image, the three-dimensional object detection framework further comprises: extracting the candidate bounding box of the target from the image by using the two-dimensional detector, so as to obtain the point cloud data of a corresponding area in the point cloud space according to the candidate bounding box of the target.

3. The three-dimensional object detection framework based on multi-source data knowledge transfer according to claim 1, wherein before the extraction of the first image feature from the image, the three-dimensional object detection framework further comprises: receiving, by a computer system, an annotation label input by a tester for the image.

4. The three-dimensional object detection framework based on multi-source data knowledge transfer according to claim 3, wherein the generation of the series of the two-dimensional bounding boxes of the interested target according to the first image feature further comprises:

the interested target selection unit, configured to detect the interested target from the first image feature, and using an RPN (region proposal network) network to output the series of the two-dimensional bounding boxes corresponding to the interested target; and calculating IoU values of the two-dimensional bounding boxes corresponding to the interested target and the annotation label on the two-dimensional image, and selecting an annotation label with the maximum IoU value as a real label of the interested target, extracting and outputting point cloud data of an area that has a corresponding relationship with the real label to the point cloud feature extraction unit in the point number space, and further outputting the center point coordinates of the two-dimensional bounding boxes to the three-dimensional target parameter prediction unit, wherein the annotation label refers to a label manually labeled by the tester on the image before the extraction of the first image feature from the image, wherein the point cloud feature extraction unit extracts the point cloud feature from the point cloud data, and outputs the point cloud feature to the knowledge transfer unit and the three-dimensional target parameter prediction unit.

5. The three-dimensional object detection framework based on multi-source data knowledge transfer according to claim 4, wherein the extraction of the point cloud feature from the point cloud data specifically comprises:

inputting the point cloud data into a one-dimensional convolutional neural network model;

improving training performance of the one-dimensional convolutional neural network model through residual connection, and enhancing a modeling ability of the one-dimensional convolutional neural network model to global information of the point cloud space through an attention mechanism; and executing a maximum pooling operation to obtain the point cloud feature corresponding to the interested target.

6. The three-dimensional object detection framework based on multi-source data knowledge transfer according to claim 1, wherein the calculation of the cosine similarity between the image feature and the point cloud feature further comprises:

calculating the cosine similarity between the received image feature and the point cloud feature according to the received image feature and the point cloud feature;

minimizing the cosine similarity; and calculating and back propagating a gradient of the image feature to update parameters of the image feature extraction unit and the point cloud feature extraction unit using a two-dimensional convolutional neural network model of an image feature unit, wherein error between the image feature and the point cloud feature can be obtained according to the minimized cosine similarity, the gradient of the image feature is calculated and back propagated according to the error obtained, and all the parameters of the two-dimensional convolutional neural network of the image feature unit, such as weight are updated and adjusted so as to find a minimum value of a loss function in the two-dimensional convolutional neural network.

7. The three-dimensional object detection framework based on multi-source data knowledge transfer according to claim 1, wherein the generation of the three-dimensional bounding box according to the image feature and the point cloud feature further comprises:

mapping, by a linear layer of the three-dimensional target parameter prediction unit, the received image feature and the point cloud feature to generate the three-dimensional bounding box, and the knowledge transfer unit inputs a first feature vector corresponding to the image feature and a second feature vector corresponding to the point cloud feature to the linear layer of the three-dimensional target parameter prediction unit, and the linear layer maps the first feature vector and the second feature vector to output the three-dimensional bounding box;

predicting a depth coordinate z, and then predicting coordinates x and y of the three-dimensional bounding box by the following formula (1), wherein the formula (1) is:

$$x = \frac{(u - c_u) * z}{f_u} \tag{1}$$

$$y = \frac{(v - c_v) * z}{f_v}$$

wherein, $[f_u, 0, c_u; 0, f_v, c_v; 0,0,1]$ is internal parameters of a camera, and (u, v) is pixel coordinates of a center point of the two-dimensional bounding box obtained by the interested target selection unit, thereby obtaining the center point coordinates (x, y, z) of the three-dimensional bounding box;

predicting quaternion by the following formula (2) according to the center point coordinates of the three-dimensional bounding box, and then converting the quaternion into the Euler angle by the following formula (3) to eliminate a Gimbal lock problem of the Euler angle, wherein expressions of the formulas (2) and (3) are as follows:

$$\text{atan2}(x, y) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ \text{undefined} & y = 0, x = 0 \end{cases} \tag{2}$$

$$\begin{bmatrix} \alpha \\ \beta \\ \gamma \end{bmatrix} = \begin{bmatrix} \text{atan2}(2(wx + yz), 1 - 2(x^2 + y^2)) \\ \arcsin(2(wy - xz)) \\ \text{atan2}(2(wz + xy), 1 - 2(y^2 + z^2)) \end{bmatrix} \tag{3}$$

wherein, the quaternion is expressed as $\vec{q} = (w,x,y,z) = w+xi+yj+zk$, and the Euler angle is expressed as roll, pitch, yaw = $(\alpha, \beta, \gamma)$;

calculating length, width and height parameters of the three-dimensional bounding box according to the center point coordinates of the three-dimensional bounding box, the Euler angle, and mapping of the image feature and the point cloud feature on the linear layer, and outputting the center point coordinates (x, y, z) of the three-dimensional bounding box, the Euler angle parameters $(\alpha, \beta, \gamma)$, and the length, width, and height parameters of the three-dimensional bounding box; and generating, by the three-dimensional target parameter prediction unit, the corresponding three-dimensional bounding box according to the second image feature, and calculating and outputting nine degree-of-freedom parameters of the corresponding three-dimensional bounding box according to the corresponding three-dimensional bounding box and the center point coordinates of the corresponding two-dimensional bounding box.

* * * * *